B. F. JOHNSON.
ROTARY CUTTER SHARPENING DEVICE.
APPLICATION FILED APR. 23, 1920.

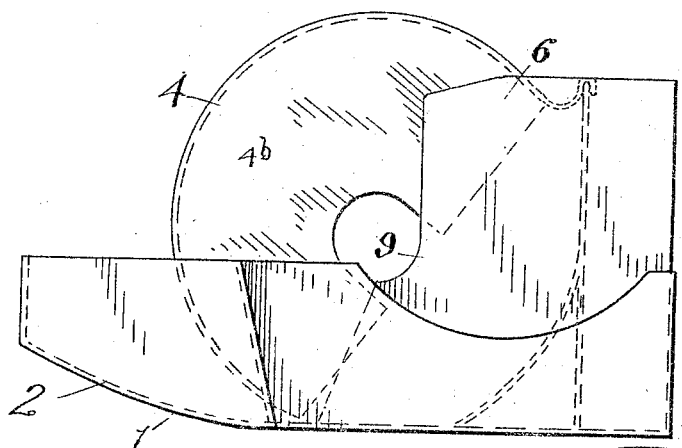
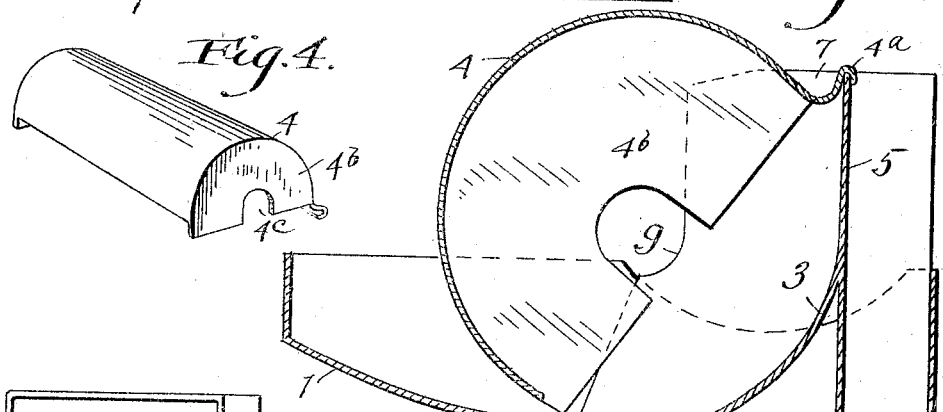
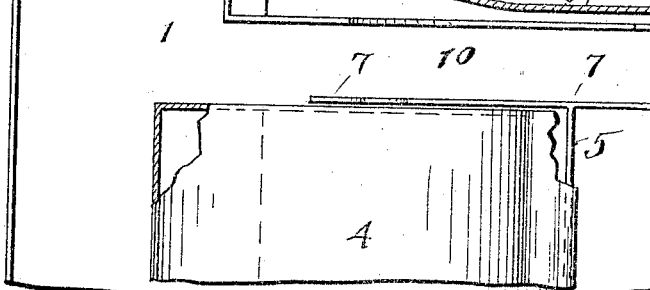
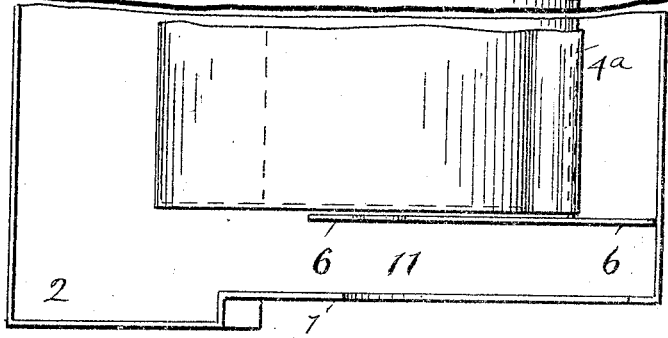

1,367,703.

Patented Feb. 8, 1921.
2 SHEETS—SHEET 2.

Inventor
Benjamin F. Johnson
by
Thurston Kwis & Hudson
attys

UNITED STATES PATENT OFFICE.

BENJAMIN F. JOHNSON, OF CLEVELAND, OHIO.

ROTARY-CUTTER-SHARPENING DEVICE.

1,367,703.  Specification of Letters Patent.  Patented Feb. 8, 1921.

Application filed April 23, 1920. Serial No. 376,003.

*To all whom it may concern:*

Be it known that I, BENJAMIN F. JOHNSON, a citizen of the United States, residing at Cleveland, in the county of Cuyahoga and State of Ohio, have invented a certain new and useful Improvement in Rotary-Cutter-Sharpening Devices, of which the following is a full, clear, and exact description.

The present invention relates to an apparatus which is adapted to receive a rotary knife structure, such as a lawn mower, and when a suitable grinding compound is added, permits the rotary knife structure to be sharpened *in situ*.

It will be obvious, as the description proceeds, that the present invention is applicable for use in sharpening other rotary knife constructions besides lawn mowers, but the invention will be described with respect to its application to a lawn mower construction, this being intended as no limitation.

Figure 5:
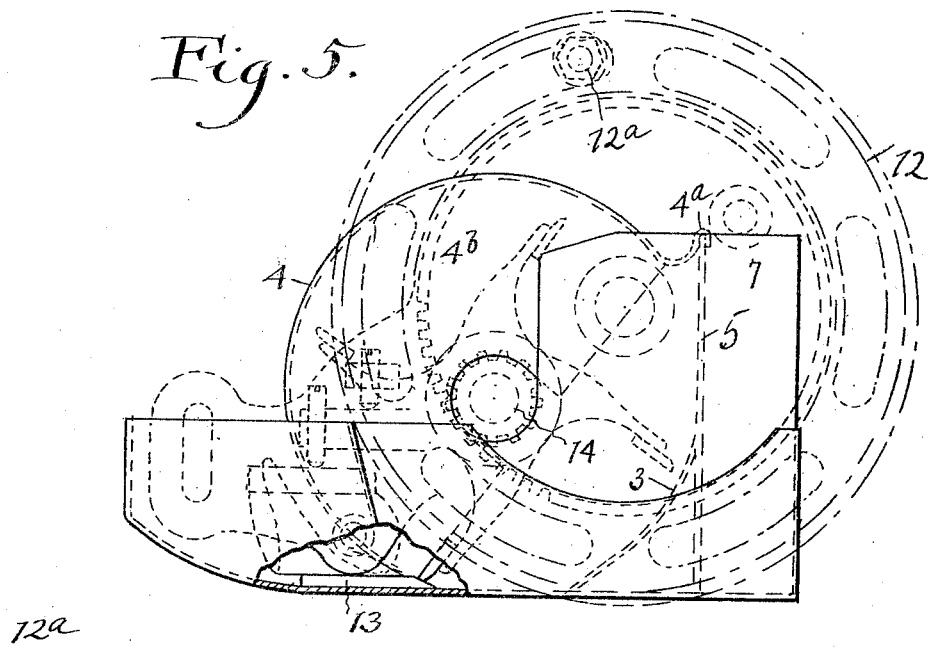
Figure 6:
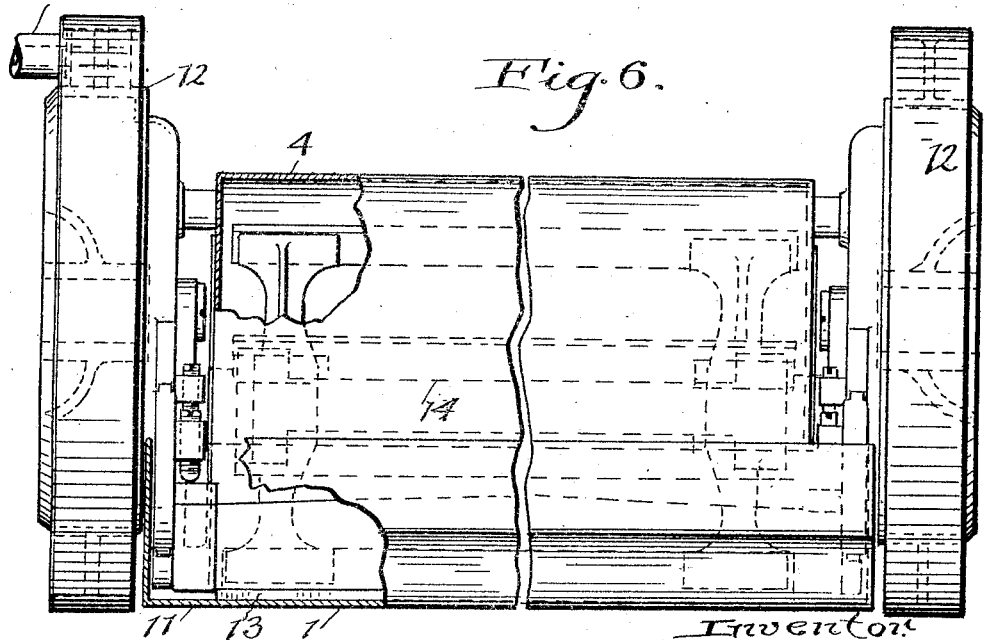

Reference should be had to the accompanying drawings forming a part of this specification, in which Figure 1 is a side elevation of a device embodying my invention; Fig. 2 is a sectional elevation; Fig. 3 is a top plan view; Fig. 4 is a perspective, showing part of the device; Fig. 5 shows the device with a lawn mower positioned with respect thereto. Fig. 6 is a front elevation of the device with a lawn mower positioned therein.

The present methods employed for sharpening rotary cutter blade constructions, by hand sharpening or machine sharpening methods, require that the rotary blade structure be removed from its mounting in the machine of which it forms a part. Under such circumstances the cutting blades may be properly sharpened, but when the blade structure is put back into its own machine the blades and the cutter bar, with which the blades coöperate, must be relatively adjusted to secure proper cutting action and this is difficult to obtain, except where an exceptionally good job of sharpening the cutter blades has been obtained.

Broadly, then my invention may be said to include the provision of a suitable container, which will suitably house the rotary cutter blade structure and the cutter bar, introduce into the housing a suitable grinding mixture, such as oil and emery, and then rotate the cutter blade structure so that the cutter blades will sharpen themselves against the cutter bar.

Referring more particularly to Figs. 1 to 4 in the drawings, the apparatus there shown comprises a pan 1, which pan has side walls and preferably at the forward portion thereof the lower part is curved, or slanting, as indicated at 2, so that the mixture of oil and emery, which may be used within the pan, will tend to run toward the bottom of the pan and immerse the cutter bar of the device to be sharpened, as will later appear.

Within the pan there is mounted a housing, which comprises a partially cylindrical shaped wall 3 and semi-cylindrical shaped cover 4. The cover member 4 is provided with a lip 4ª, which engages over the top edge of a wall 5, that extends transversely between side members 6 and 7. This member 5 meets with the cylindrical portion 4, as before described and forms a part or wall of the general cylindrical casing. The cover member 4 has its own side walls 4ᵇ, as shown in Fig. 4, which together with the side walls 6 and 7 form the side walls for the cylindrical member 3. As will be seen by reference to the drawing the side walls 4ᵇ of the member 4 fit within the side walls 6 and 7, and the lower edge of the cover 4 rests substantially against the bottom of the pan 1.

The cover 4 is at its opposite ends, provided with recesses, or slots, 4ᶜ and the side walls are provided with notched out portions, such as indicated at 9, which when the cover is in position, as shown in Figs. 1 and 2, coöperate with the slots 4ᶜ, so as to permit the passage of a shaft upon which the cutter bars to be sharpened are mounted. As will be noticed, the side wall members 6 and 7 are spaced from the side wall members of the pan 1, thereby providing the spaces 10 and 11. This space is provided for accommodating certain parts of the lawn mower which lie between the cutter blade structure and wheels.

In Figs. 5 and 6 there is indicated a lawn mower, with the usual handle and rollers behind the cutter bar, removed. The structure then is capable of being placed within the pan 1, with the exception of the side wheels of the lawn mower, such as indicated at 12, which lie upon the outside of the side walls of the pan 1. The cutter bar of the machine is indicated at 13 in Fig. 5 and rest substantially upon the bottom of the pan. The shaft upon which the cutter blades are mounted is indicated at 14, and as will be seen, extends within the cylindrical portion of the cover member 4 and the walls 3 and 5, which coöperate with it. The space between the side walls 6 and 7 is occupied by the frame work and mechanism, by which the cutter bar shaft is driven from the wheels.

The cutter bar structure, itself, is embraced within the cylindrical casing, as described.

In operating the device, the pan 1 is mounted upon a support in such a fashion that the wheels 12 may be rotated, and for this purpose there may be supplied to the wheels 12 a handle $12^a$, so that it may be grasped by the hand for the purpose of rotating the wheels. In the pan 1, as before described, there is introduced a suitable sharpening composition, which may consist of oil and emery. After the introduction of the sharpening compound, and the wheels 12 are rotated, the cutting cutter blade shaft is turned and the blades are brought into successive engagement with the cutter bar 13. This then causes the cutter blades to be sharpened. It will, of course, be evident that the cutter bar should be properly adjusted so as to secure the proper coöperation between the cutter bar and the cutter blades, as the cutter blades are rotated.

This method of sharpening the cutting blades produces a result, which is much better than where the blades are separately sharpened for upon the completion of a sharpening operation, the blades are in proper cutting relation to the cutter bar, if the cutter bar has been properly adjusted, in the first place.

It is obvious that the particular form of casing that has been described is especially adapted for the sharpening of lawn mower cutting blades and that the particular shape which the housing for the cutter blades may assume under different conditions will vary. However, the general characteristics will be the same.

Having described my invention, I claim—

1. In a rotary knife sharpening apparatus a pan, a pair of upstanding walls within the pan, recesses formed in each of said walls and adapted to receive the journal of the rotary knife apparatus, a removable cover coöperating with the said upstanding walls and adapted to inclose the rotary knife structure, said covers being provided with recesses which also coöperate with the journal of the rotary knife structure, the said cover member being of less width than the pan.

2. A lawn mower sharpening device comprising a pan having a portion adapted to receive the cutter bar of the lawn mower, a pair of upstanding walls within the pan, each of said walls having a recess adapted to receive the journal of the cutting blades, a removable cover coöperating with the side walls and adapted to inclose the cutter blades of the lawn mower.

3. In a rotary knife sharpening apparatus, a pan having side walls, a pair of spaced upstanding walls within the pan, a cross wall which coöperates with said upstanding walls, a curved wall extending between said upstanding walls and coöperating with the cross walls, a substantial semi-cylindrical member having end walls, means for pivotally mounting one edge of said semi-cylindrical member upon the said cross wall, the side walls of the semi-cylindrical member coöperating with the upstanding walls before mentioned.

In testimony whereof, I hereunto affix my signature.

BENJAMIN F. JOHNSON.